US012212898B2

(12) United States Patent
Montandon et al.

(10) Patent No.: US 12,212,898 B2
(45) Date of Patent: Jan. 28, 2025

(54) METHOD, MODULE AND SYSTEM FOR PROJECTING ONTO A WORKPIECE AND IMAGE CALCULATED ON THE BASIS OF A DIGITAL MOCKUP

(71) Applicant: Dassault Systèmes, Vélizy-Villacoublay (FR)

(72) Inventors: Christophe Montandon, Gradignan (FR); Jean-Baptiste Delhommeau, Eysines (FR)

(73) Assignee: Dassault Systèmes, Vélizy-Villacoublay (FR)

( * ) Notice: Subject to any disclaimer, the term of this patent is extended or adjusted under 35 U.S.C. 154(b) by 683 days.

(21) Appl. No.: 17/278,555

(22) PCT Filed: Sep. 19, 2019

(86) PCT No.: PCT/FR2019/052197
§ 371 (c)(1),
(2) Date: Jun. 8, 2021

(87) PCT Pub. No.: WO2020/058643
PCT Pub. Date: Mar. 26, 2020

(65) Prior Publication Data
US 2021/0352252 A1    Nov. 11, 2021

(30) Foreign Application Priority Data
Sep. 21, 2018    (FR) ...................................... 1858577

(51) Int. Cl.
*H04N 9/31*     (2006.01)
*G01B 11/25*    (2006.01)
*G06T 7/70*     (2017.01)

(52) U.S. Cl.
CPC ....... *H04N 9/3185* (2013.01); *G01B 11/2513* (2013.01); *G06T 7/70* (2017.01); *H04N 9/3194* (2013.01); *G06T 2207/30164* (2013.01)

(58) Field of Classification Search
CPC .............. H04N 9/3185; H04N 9/3194; G01B 11/2513; G06T 7/70; G06T 2207/30164; G06T 7/74; G06T 11/00; G06T 19/006
See application file for complete search history.

(56) References Cited

U.S. PATENT DOCUMENTS

2013/0113975 A1    5/2013  Gabris
2014/0160115 A1*   6/2014  Keitler ................... G06T 7/248
                                                    345/419

(Continued)

FOREIGN PATENT DOCUMENTS

CN    103019643 A    4/2013
CN    104780865 A    7/2015

(Continued)

OTHER PUBLICATIONS

N. D. Filho et al., "An Automated Platform for Immersive and Collaborative Visualization of Industrial Models," 2009 14th IEEE International Conference on Engineering of Complex Computer Systems, Potsdam, Germany, 2009, pp. 258-264, doi: 10.1109/ICECCS.2009.37. (Year: 2009).*

(Continued)

*Primary Examiner* — Magda Cruz
(74) *Attorney, Agent, or Firm* — TraskBritt

(57) ABSTRACT

A method for projecting onto a real workpiece an image calculated on the basis of a digital mockup recorded on a digital information server associated with the real workpiece, for the viewing of the workpiece under augmented reality, comprises the following steps: capture by a camera of the image of the real workpiece, real-time alignment of the reference frame associated with the digital mockup with (Continued)

the reference frame of the video capture system and the reference frame of the real workpiece, comprising a step of reprocessing of the image calculated as a function of the topology of the digital mockup and as a function of the orientation of the projection means with respect to the real workpiece.

15 Claims, 2 Drawing Sheets

(56) References Cited

U.S. PATENT DOCUMENTS

| | | | |
|---|---|---|---|
| 2015/0213584 A1* | 7/2015 | Ishikawa | H04N 9/3194 345/637 |
| 2015/0288952 A1* | 10/2015 | Popilka | A61B 5/4547 348/46 |
| 2016/0358382 A1 | 12/2016 | Lee et al. | |
| 2017/0054954 A1 | 2/2017 | Keitler et al. | |
| 2017/0213396 A1* | 7/2017 | Kang | H04N 9/3185 |
| 2019/0279433 A1* | 9/2019 | Borke | G06T 7/001 |
| 2020/0004222 A1* | 1/2020 | Stubler | G05B 19/4097 |

FOREIGN PATENT DOCUMENTS

| | | |
|---|---|---|
| CN | 104811637 A | 7/2015 |
| CN | 107105209 A | 8/2017 |
| FR | 3021784 B1 | 10/2017 |
| WO | 2003032129 | 4/2003 |
| WO | 2004093444 | 10/2004 |
| WO | 2015091291 | 6/2015 |

OTHER PUBLICATIONS

M. Panchetti, J.-P. Pernot and P. Veron, "Polyhedral simplification preserving character lines extracted from images," IEEE International Conference on Shape Modeling and Applications 2007 (SMI '07), Minneapolis, MN, USA, 2007, pp. 81-90, doi: 10.1109/SMI. 2007.28. (Year: 2007).*
International Search Report for International Application No. PCT/FR2019/052197 dated Dec. 4, 2019, 2 pages.
International Written Opinion for International Application No. PCT/FR2019/052197 dated Dec. 4, 2019, 10 pages.
Lindlbauer et al., Combining Shape-Changing Interfaces and Spatial Augmented Reality Enables Extended Object Appearance, http://dx.doi.org/10.1145/2858036.2858457, Jan. 18, 2018, 13 pages.
Raskar et al., Shader Lamps: Animating Real Objects with Image-Based Illumination, Eurographics Workshop on Rendering Techniques, EGSR 2001: Rendering Techniques (2001) pp. 89-102.
Raskar et al., ILamps: Geometrically Aware and Self-Configuring Projectors, https://www.researchgate.net/publication/234820642, ACM Transactions on Graphics (Jul. 2003), 11 pages.
Chinese Notification of First Office Action for Application No. 201980069601.9 dated Apr. 3, 2024, 19 pages with English translation.
Xiang, Tianyuan, Scalable Platform for Real-Time Multi-Projector Augmented Reality, A Dissertation Submitted to Shanghai Jiao Tong University for the Degree of Master of Engineering, Jul. 15, 2011, 71 pages.

* cited by examiner

METHOD, MODULE AND SYSTEM FOR PROJECTING ONTO A WORKPIECE AND IMAGE CALCULATED ON THE BASIS OF A DIGITAL MOCKUP

CROSS-REFERENCE TO RELATED APPLICATIONS

This application is a national phase entry under 35 U.S.C. § 371 of International Patent Application PCT/FR2019/052197, filed Sep. 19, 2019, designating the United States of America and published as International Patent Publication WO 2020/058643 A1 on Mar. 26, 2020, which claims the benefit under Article 8 of the Patent Cooperation Treaty to French Patent Application Serial No. 1858577, filed Sep. 21, 2018.

TECHNICAL FIELD

The present disclosure relates to a system for visual display of information on real objects, for augmented reality applications in industry, in particular, for the design, the manufacture, the assembly, or the maintenance of technical workpieces.

BACKGROUND

Various augmented reality systems are known for extending the perception of the visual reality with information originating from a digital mockup and more generally digital content that can be projected on the surface of the real object, for example, icons or texts designating the parts of the object on which an operator must intervene.

These augmented reality solutions make it possible to improve the effectiveness of manual work steps in manufacture, assembly and maintenance, and, at the same time, the quality of the work to be improved. The precise transmission of information, for example, the state of digital planning (CAO model), directly to a workpiece, makes the transmission complex and makes the construction plans subject to error, by using dispensable models and other measuring instruments. A visual variance comparison can be carried out at any time, and in a manner intuitive for a user. Moreover, work instructions, for example, step-by-step instructions, may be provided directly on the work object or in the user's field of vision, i.e., exactly where they are actually necessary. Typical scenarios of application of the present disclosure include worker assistance systems for displaying assembly and maintenance instructions, and information for quality assurance. For example, the assembly positions or the drilling holes may be marked precisely, or weld points or supports to be verified may be identified. The system is also capable of providing assistance to maintenance personnel on-site, by non-resident experts who can control the projection from a distance, by means of an integrated camera.

The workpieces to be machined must be calibrated precisely, depending on the position and the orientation of the projector, so as to allow for an association between the referential of the additional information, and the referential of the real object.

A solution of adjustment of the referentials is based on the use of markers: the system for visual display of information on real objects comprises a projection unit that graphically transmits an item of information to an object, and a dynamic tracking device having a 3D sensor system that determines and maintains the position and/or the orientation of the object and/or of the projection unit in space. A control device for the projection unit adapts the transmission of the information to the current position and/or to the orientation of the object and/or of the projection unit, as determined by the tracking device.

The combination of a projector with a dynamic 3D tracking device allows for continuous and automatic calibration (dynamic referencing) of the projector and/or of the object on which an item of information must be displayed, with respect to the working environment. It follows therefrom that the projection unit and the object can both be displaced freely, since the graphical and/or pictorial transmission of the information is automatically tracked at each movement of the projection unit or of the object.

Other solutions make it possible to calculate the location of the real object with respect to the point of view of the user to permanently align the digital information with the real world, without affixing markers. The SLAM (simultaneous localization and mapping) technology makes it possible to make a 3D reconstruction of the environment.

Other solutions are based on automatic learning algorithms that make it possible to recognize the object and to track it over time.

The international patent application WO201591291 is known from the prior art, which application relates to an execution and control method for a step of machining on a workpiece, using a system comprising a projector, a photogrammetry device, as well as a control unit which knows the relative position of the projector and of the photogrammetry device. The method comprises the following steps: referencing with the aim of determining the position of the workpiece with respect to the projector and to the photogrammetry device in a predefined coordinate system; projection of a work instruction on the workpiece; machining of the workpiece by an operator; and control of the machining by scanning at least a partial zone of the surface of the workpiece. All the steps are carried out by the system on the same workstation, within the context of an integrated process, with the exception of machining by the operator.

The international patent application WO200493444 is also known, relating to a method that makes it possible to display an output image on an object. For this purpose, a group of unique markers is fixed to the object in predetermined positions. An input image of the object and markers is captured by a camera in a fixed physical relation with respect to a projector. A position of the projector with respect to the markers is determined from the image. Then, one or more output images relating to the object can be projected on the object, at predetermined locations, depending on the position of the projector and the unique markers.

The French patent FR3021784 describes a method for projecting information originating from a digital design model, the method comprising the following steps:

a step of calibration comprising acquisition of characteristic data originating from a surface of interest, the comparison of the characteristic data with digital data originating from the digital design model, and determination of a spatial position of the projection device comprising a video projector and at least two distinct image acquisition devices, and a step of projection, according to the spatial position, of information originating from the digital design model, by means of the video projector, on the surface of interest.

The international patent application WO200332129 describes another example of a system that makes it possible to view deviations on a real surface with respect to a nominal, or drawn, surface that uses a system and a method consisting in mapping the spatial coordinates (for example, x, y and z) of the real surface on a computer, comparing the mapped real surface with the nominal surface in order to achieve a three-dimensional distribution of deviation values (D), processing the distribution in a topographical pattern of multiple contours or zones, each contour or zone having the same, or generally the same, deviation value (D), and optically projecting the topographical pattern on the real surface, in accordance with the initial mapping of the surface in order to produce a display of superficial deviations (D) directly on the real surface. The deviations are measured according to an orientation D perpendicular to the real surface, which makes it possible to give the three-dimensional distribution in coordinates x, y, D. The optical projection is preferably a laser projection. The mapping and the projection on the real surface are carried out and coordinated with respect to three reference points on the surface.

The United States patent application US20160358382 describes an embodiment of a method for real-time augmented reality using 3D projection techniques, the method comprising:

sensing, by a 3D sensor coupled to a computing device, one or more instances of scanning of a physical object in a scene;

generating, by means of the computing device, one or more 3D models of the physical object on the basis of the scanning;

determining, by means of the computing device, a position of the 3D model or models with respect to a projector on the scene;

pre-providing, by the computing device, an image content based on the position of the 3D model(s) in order to generate a rendered image map and a calibration result; and superimposing, by means of a projector coupled to the computing device, the rendered image map onto the physical object in the scene, using the calibration result.

The United States patent application US20170054954 describes a system for visually displaying information on real objects, comprising:

a projection unit comprising at least one projector that geographically or visually transmits an item of information to an object, the information comprising at least information originating from construction plans of the object;

a dynamic tracking device having a 3D sensor system comprising at least one camera, in which the dynamic tracking device determines and maintains a track and/or orientation of the object and/or of the projection unit, in space;

a plurality of markers arranged at the reference points of an environment in which the system is used, and in which the markers are capable of being detected by the 3D sensor system of the dynamic tracking device; and in which the projection unit is controlled, adapting a transmission of the information at a current position and/or orientation of the object and/or of the projection unit, determined by the dynamic tracking device, and in which the dynamic tracking device is designed for continuous detection of the position and/or of the orientation of the object and/or of the projection unit in real time, such that any divergence from the construction plans can be identified by a worker, on the basis of the transmission of the projection unit.

The solutions of the prior art are not entirely satisfactory, since, in some situations, the projection of information in augmented reality disturbs the operator. For example, when the real workpiece has through-cavities, and the projector is in the axis of such a cavity, the beam may dazzle the operator when they intervene on the side of the workpiece opposite the projector.

In the same way, when the projection is carried out on curved parts of the workpiece on which the augmented reality image is projected or offset with respect to a reference plane that is normal with respect to the projection axis, the information cannot be used, on account of the deformation or the blurring that results therefrom.

BRIEF SUMMARY

The present disclosure aims to overcome these disadvantages by proposing self-adaptation of the projection, depending on the topology and the position of the workpiece with respect to the projector.

For this purpose, according to a first aspect of the present disclosure, a projection method is proposed for projecting an image calculated on the basis of a digital mockup recorded on a server onto a real workpiece associated with the digital mockup, for the viewing of the workpiece under augmented reality, the method comprising the steps of:

capture by a camera of the image of the real workpiece, and real-time adjustment of the reference frame associated with the digital mockup with the reference frame of the video capture system and the reference frame of the real workpiece.

According to a first aspect of the present disclosure, the method comprises a step of reprocessing of the calculated image depending on the topology of the digital mockup and depending on the orientation of the projection means with respect to the real workpiece.

The reprocessing step may comprise detection of a through-zone of the real object, on the basis of the topology of the digital mockup and on the basis of the orientation of the projection means with respect to the real workpiece, and may comprise an attenuation of the light intensity of the zones of the calculated image corresponding to the through-zone thus detected.

Advantageously, the reprocessing step may comprise detection of a zone of the digital mockup that is offset in depth with respect to a reference plane perpendicular to the axis passing through the focal point of the projector and the barycenter of the real workpiece, and may comprise modification of the calculated image in the portions corresponding to the zone.

According to one option, the modification may comprise blacking out, in the calculated image, additional digital information.

According to another option, which can possibly be combined with the first option, the modification may comprise a digital correction in order to compensate the offset between the projection surface and the reference plane to the pixels of the zones.

According to a particular embodiment, the correction may comprise production of an error matrix, formed by the difference between a matrix calculated on the basis of the image acquired on the basis of the real workpiece, and a reference matrix corresponding to the topology of the digital mockup repositioned in the same referential, and then production of an error criterion and a modification of the cells of the reference matrix of the image to be projected that is in the process of being adapted, so as to minimize the error matrix and/or a scalar measure thereof.

According to a second aspect of the present disclosure, a projection module is proposed for projecting an image calculated on the basis of a digital mockup recorded on a server onto a real workpiece associated with the digital mockup, for the viewing of the workpiece under augmented reality, comprising:

an image capture module of the real workpiece, and an adjustment module designed for real-time adjustment of a reference frame associated with the digital mockup with a reference frame of the video capture system and a reference frame of the real workpiece.

According to the present disclosure, the projection module comprises a reprocessing module designed for reprocessing the calculated image, depending on the topology of the digital mockup and depending on the orientation of the projection means with respect to the real workpiece.

The various modules may be implemented in electronic form, in the form of software, or even, for example, in the form of FPGA.

According to a third aspect of the present disclosure, a projection system is proposed, comprising:

a camera, a digital information server comprising a digital mockup, a real workpiece associated with the digital mockup, and a projection module according to the second aspect of the present disclosure, or one or more of the improvements thereof.

According to one option, the reprocessing module is designed to implement the reprocessing step according to the first aspect of the present disclosure, or one or more of the improvements thereof.

According to a fourth aspect of the present disclosure, a computer program product is proposed, which can be directly loaded into the internal memory of a computer, comprising software code portions for executing the steps of the method according to any of the preceding claims, when the program is executed on a computer.

BRIEF DESCRIPTION OF THE DRAWINGS

Other data, features and advantages of the present disclosure will emerge from reading the description of implementations and embodiments, which are in no way limiting, with reference to the accompanying drawings, in which.

DETAILED DESCRIPTION

Since the embodiments described in the following are in no way limiting, it is, in particular, possible to envisage variants of the present disclosure that comprise only a selection of features described in the following, in a manner isolated from the other features described, if this selection of features is sufficient for providing a technical advantage or for distinguishing the present disclosure from the prior art. This selection comprises at least one feature, preferably functional and without structural details, or having some of the structural details if this part alone is sufficient for providing a technical advantage or for distinguishing the present disclosure from the prior art.

Figure 1:
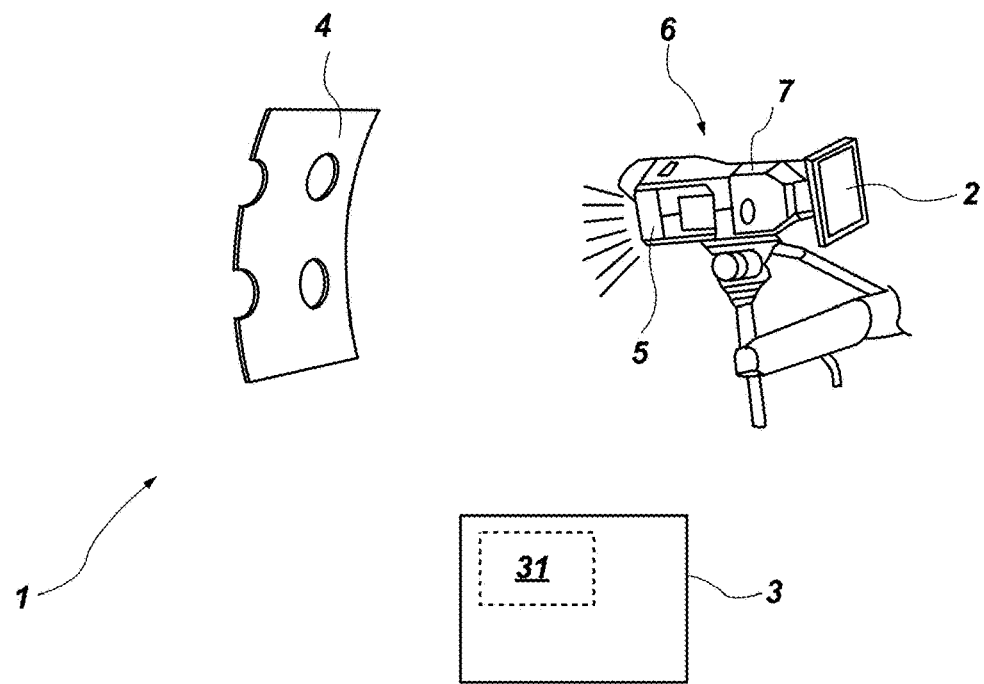
FIG. 1 shows an embodiment of a system according to the present disclosure.

FIG. 1 shows a first embodiment of a projection system 1 according to the present disclosure.

The projection system 1 comprises:

a camera 2, a digital information server 3 comprising a digital mockup 31, a real workpiece 4 associated with the digital mockup 31, and a projection module 5 according to an embodiment of a projection module according to the present disclosure.

According to the example shown by FIG. 1, the camera 2 and the projection module 5 are integrated within the same device 6.

The projection module 5 is designed to project an image on the real workpiece 4.

The projected image is calculated from the digital mockup 31 recorded on the digital information server 3.

Thus, according to the embodiment shown in FIG. 1, the projection module 5 comprises:

an image capture module of the real workpiece, formed here by the camera 2, and a calculation unit 7.

The calculation unit 7 is designed to adjust, in real-time, a reference frame associated with the digital mockup 31 with a reference frame of the capture module, formed here by the camera 2, and a reference frame of the real workpiece 4.

The calculation unit 7 is furthermore designed to reprocess the calculated image depending on the topology of the digital mockup 31 and depending on the orientation of the projection module 5 with respect to the real workpiece 4.

Figure 2:
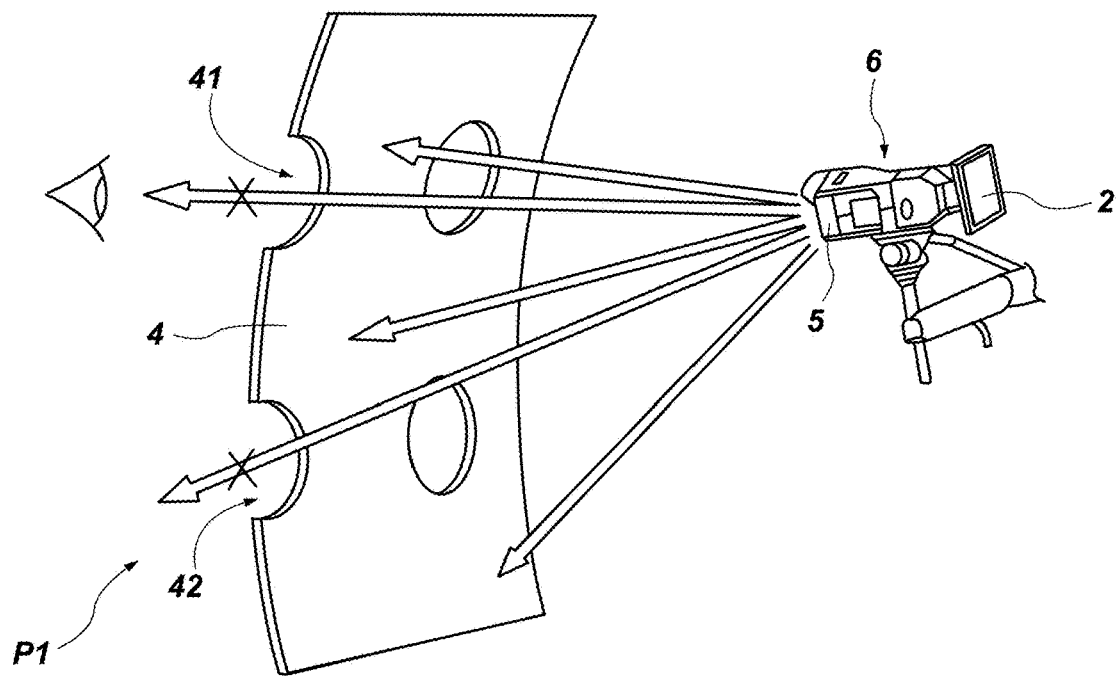
FIG. 2 shows a first implementation of a method according to a first embodiment of a method according to the present disclosure.

FIG. 2 shows an implementation of a first embodiment of a method P1 according to the present disclosure.

The method P1 comprises:

a step of capturing, by the camera 2, the image of the real workpiece 4, a step of real-time adjustment of the reference frame associated with the digital mockup 31 with the reference frame of the camera 2 and the reference frame of the real workpiece 4, and a step of reprocessing of the calculated image depending on the topology of the digital mockup 31 and depending on the orientation of the projection means with respect to the real workpiece 4.

As is illustrated by FIG. 2, the reprocessing step of the method P1 further comprises:

detection of two through-zones 41 and 42 of the real workpiece 4, on the basis of the topology of the digital mockup 31 and the orientation of the projection module 5 with respect to the real workpiece, and attenuation of the light intensity of the zones of the calculated image corresponding to the two through-zones 41 and 42 thus detected.

In addition, this makes it possible to avoid dazzling an eye of a user receiving a beam projected through the corresponding zone and originating from the projection of the reprocessed image by the projection module 5.

A method P2 is proposed, according to a second embodiment of a method according to the present disclosure, described merely with respect to the differences thereof compared with the method P2.

Figure 3:
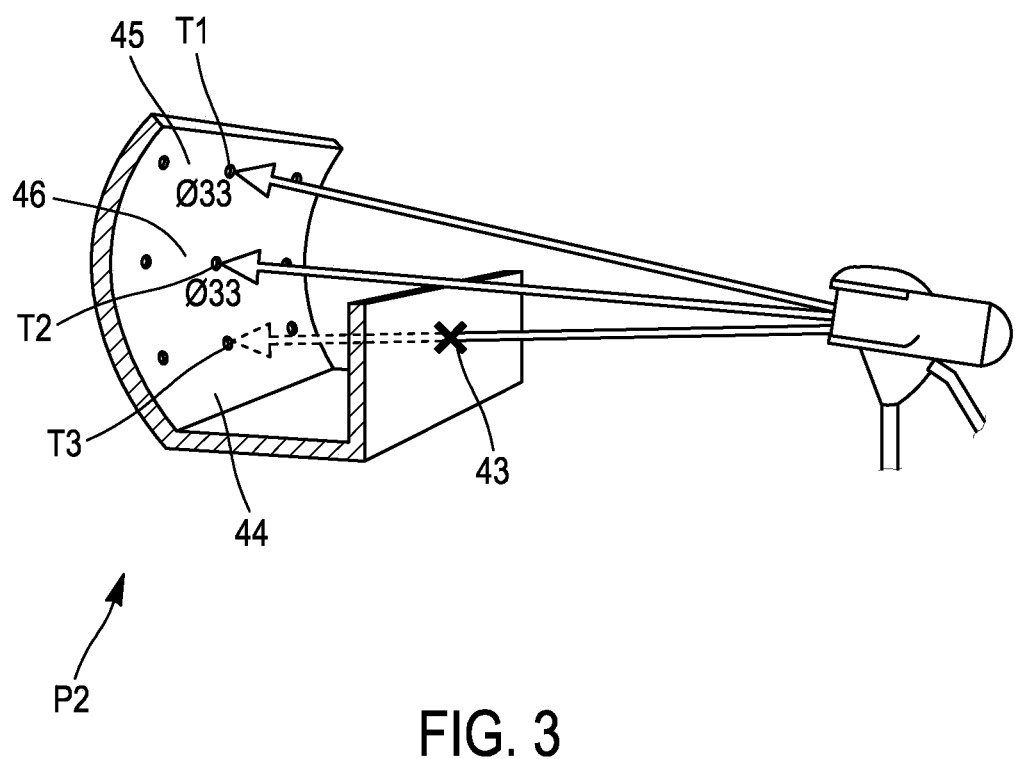
FIG. 3 shows a second implementation of a method according to a second embodiment of a method according to the present disclosure.

FIG. 3 shows an implementation of the second embodiment.

The reprocessing step of the method P2 comprises:

detection of a zone of the digital mockup 31, which is offset in depth with respect to a reference plane perpendicular to the axis passing through the focal point of the projector and the barycenter of the real workpiece, and modification of the calculated image in the portions corresponding to the zone.

The zone of the real workpiece 4 corresponding to the zone of the digital mockup 31, which is offset in depth is denoted in the figure by number 43.

The reference plane perpendicular to the axis passing through the focal point of the projector and the barycenter of the real workpiece is denoted in the figure by number 44.

The calculated image may comprise additional digital information 45 and 46, for example, in order to indicate a diameter of the two top holes T1, T2 shown in the figure.

The calculated image may also comprise additional digital information corresponding to the diameter of the bottom hole shown in FIG. 3.

However, in the embodiment shown in the figure, upon detection of the offset between the zone of the digital mockup 31 and the reference plane, the calculated image is modified by blacking out, in the calculated image, the additional digital information corresponding to the hole T3.

According to a first variant of the method P2, described merely with respect to the differences thereof compared with the latter, the modification may comprise a digital correction in order to compensate the offset between the projection surface and the reference plane.

According to a second variant of the method P2, described merely with respect to the differences thereof compared with the method P2, and which can optionally be combined with the first variant, the correction step comprises production of an error matrix, formed by the difference between a matrix calculated on the basis of the image acquired on the basis of the real workpiece, and a reference matrix corresponding to the topology of the digital mockup repositioned in the same referential, and then production of an error criterion and a modification of the cells of the reference matrix of the image to be projected that is in the process of being adapted, so as to minimize the error matrix and/or a scalar measure thereof.

Of course, the present disclosure is not limited to the embodiments described above, and a number of developments can be made to the embodiments, without departing from the scope of the present disclosure. Moreover, the various features, types, variants, and embodiments of the present disclosure may be associated with one another, in accordance with various combinations, insofar as they are not mutually incompatible or exclusive.

The invention claimed is:

1. A method for projecting onto a real workpiece, by a projection device, an image calculated on the basis of a digital mockup recorded on a digital information server associated with the real workpiece, for viewing of an augmented reality of the real workpiece, the method comprising the following steps:
   capture by a camera of the image of the real workpiece;
   real-time adjustment of a reference frame associated with the digital mockup with the reference frame of a video capture system and the reference frame of the real workpiece; and
   reprocessing of the image calculated as a function of a topology of the digital mockup and as a function of an orientation of the projection device with respect to the real workpiece;
   wherein the step of reprocessing of the image comprises detection of a through-zone of the real workpiece, on the basis of the topology of the digital mockup and the orientation of the projection device with respect to the real workpiece, and an attenuation of the light intensity of the zones of the calculated image corresponding to the through-zone thus detected.

2. The method of claim 1, wherein the step of reprocessing of the image comprises detection of a zone of the digital mockup that is offset in depth with respect to a reference plane perpendicular to an axis passing through a focal point of the projection device and a barycenter of the real workpiece, and a modification of the calculated image in the portions corresponding to the zone.

3. The method of claim 2, wherein the modification comprises blacking out, in the calculated image, additional digital information.

4. The method of claim 2, wherein the modification comprises a digital correction to pixels of the zones compensating for an offset between a surface onto which the image is projected and the reference plane.

5. The method of claim 4, wherein the digital correction comprises production of an error matrix formed by a difference between a matrix calculated on the basis of the image acquired on the basis of the real workpiece, and a reference matrix corresponding to a topology of the digital mockup repositioned in a same referential, and then production of an error criterion and a modification of cells of the reference matrix of the image to be projected, which is in the process of being adapted, so as to minimize the error matrix and/or a scalar measure thereof.

6. A projection module for projecting onto a real workpiece an image calculated on the basis of a digital mockup recorded on a digital information server associated with the real workpiece, for viewing of an augmented reality of the real workpiece, the projection module comprising:
   an image capture module for capturing one or more images of the real workpiece;
   an adjustment module for adjusting, in real-time, a reference frame associated with the digital mockup with a reference frame of the image capture module and a reference frame of the real workpiece; and
   a reprocessing module for reprocessing the calculated image depending on a topology of the digital mockup and depending on an orientation of the projection module with respect to the real workpiece;
   wherein the reprocessing module is configured for detecting a through-zone of the real workpiece, on the basis of the topology of the digital mockup and the orientation of the projection module with respect to the real workpiece, and for attenuating of the light intensity of the zones of the calculated image corresponding to the through-zone thus detected.

7. A projection system, comprising:
   a camera;
   a digital information server comprising a digital mockup;
   a real workpiece associated with the digital mockup; and
   a projection module for projecting onto the real workpiece a calculated image calculated on the basis of the digital mockup recorded on the digital information server, for viewing of an augmented reality of the real workpiece, the projection module comprising:
      an adjustment module for adjusting, in real-time, a reference frame associated with the digital mockup with a reference frame of the camera and a reference frame of the real workpiece; and
      a reprocessing module for reprocessing the calculated image depending on a topology of the digital mockup and depending on an orientation of the projection module with respect to the real workpiece;
      wherein the reprocessing module is configured for detecting a through-zone of the real workpiece, on the basis of the topology of the digital mockup and the orientation of the projection module with respect to the real workpiece, and for attenuating of the light intensity of the zones of the calculated image corresponding to the through-zone thus detected.

8. A non-transitory computer-readable medium storing instructions thereon that, when executed by at least one processor, cause the at least one processor to perform steps comprising:
capturing an image of a real workpiece using a camera;
adjusting in real-time a reference frame associated with a digital mockup corresponding to the real workpiece with a reference frame of the camera and a reference frame of the real workpiece; and
reprocess a calculated image as a function of a topology of the digital mockup and as a function of an orientation of a projection device with respect to the real workpiece, comprising detection of a through-zone of the real workpiece, on the basis of the topology of the digital mockup and the orientation of the projection device with respect to the real workpiece, and an attenuation of the light intensity of the zones of the calculated image corresponding to the through-zone thus detected.

9. A method for projecting onto a real workpiece, by a projection device, an image calculated on the basis of a digital mockup recorded on a digital information server associated with the real workpiece, for viewing of an augmented reality of the real workpiece, the method comprising the following steps:
capture by a camera of the image of the real workpiece;
real-time adjustment of a reference frame associated with the digital mockup with the reference frame of a video capture system and the reference frame of the real workpiece; and
reprocessing of the image calculated as a function of a topology of the digital mockup and as a function of an orientation of the projection device with respect to the real workpiece;
wherein the step of reprocessing of the image comprises detection of a zone of the digital mockup that is offset in depth with respect to a reference plane perpendicular to an axis passing through a focal point of the projection device and a barycenter of the real workpiece, and a modification of the calculated image in portions of the calculated image corresponding to the zone.

10. The method of claim 9, wherein the modification comprises blacking out, in the calculated image, additional digital information.

11. The method of claim 9, wherein the modification comprises a digital correction to pixels of the zones compensating for an offset between a surface onto which the image is projected and the reference plane.

12. The method of claim 11, wherein the digital correction comprises production of an error matrix formed by a difference between a matrix calculated on the basis of the image acquired on the basis of the real workpiece, and a reference matrix corresponding to a topology of the digital mockup repositioned in a same referential, and then production of an error criterion and a modification of cells of the reference matrix of the image to be projected, which is in the process of being adapted, so as to minimize the error matrix and/or a scalar measure thereof.

13. A projection module for projecting onto a real workpiece an image calculated on the basis of a digital mockup recorded on a digital information server associated with the real workpiece, for viewing of an augmented reality of the real workpiece, the projection module comprising:
an image capture module for capturing one or more images of the real workpiece;
an adjustment module for adjusting, in real-time, a reference frame associated with the digital mockup with a reference frame of the image capture module and a reference frame of the real workpiece; and
a reprocessing module for reprocessing the calculated image depending on a topology of the digital mockup and depending on an orientation of the projection module with respect to the real workpiece;
wherein the reprocessing module is configured for detecting a zone of the digital mockup that is offset in depth with respect to a reference plane perpendicular to an axis passing through a focal point of the projection module and a barycenter of the real workpiece, and modifying the calculated image in portions of the calculated image corresponding to the zone.

14. A projection system, comprising:
a camera;
a digital information server comprising a digital mockup;
a real workpiece associated with the digital mockup; and
a projection module for projecting onto the real workpiece a calculated image calculated on the basis of the digital mockup recorded on the digital information server, for viewing of an augmented reality of the real workpiece, the projection module comprising:
an adjustment module for adjusting, in real-time, a reference frame associated with the digital mockup with a reference frame of the camera and a reference frame of the real workpiece; and
a reprocessing module for reprocessing the calculated image depending on a topology of the digital mockup and depending on an orientation of the projection module with respect to the real workpiece;
wherein the reprocessing module is configured for detecting a zone of the digital mockup that is offset in depth with respect to a reference plane perpendicular to an axis passing through a focal point of the projection module and a barycenter of the real workpiece, and modifying the calculated image in portions of the calculated image corresponding to the zone.

15. A non-transitory computer-readable medium storing instructions thereon that, when executed by at least one processor, cause the at least one processor to perform steps comprising:
capturing an image of a real workpiece using a camera;
adjusting in real-time a reference frame associated with a digital mockup corresponding to the real workpiece with a reference frame of the camera and a reference frame of the real workpiece; and
reprocess a calculated image as a function of a topology of the digital mockup and as a function of an orientation of a projection device with respect to the real workpiece, comprising detection of a zone of the digital mockup that is offset in depth with respect to a reference plane perpendicular to an axis passing through a focal point of the projection device and a barycenter of the real workpiece, and modification the calculated image in portions of the calculated image corresponding to the zone.

* * * * *